July 19, 1966     F. A. ZAENKERT     3,261,301
RAIL TURNING ATTACHMENT
Filed Sept. 16, 1963     3 Sheets-Sheet 1
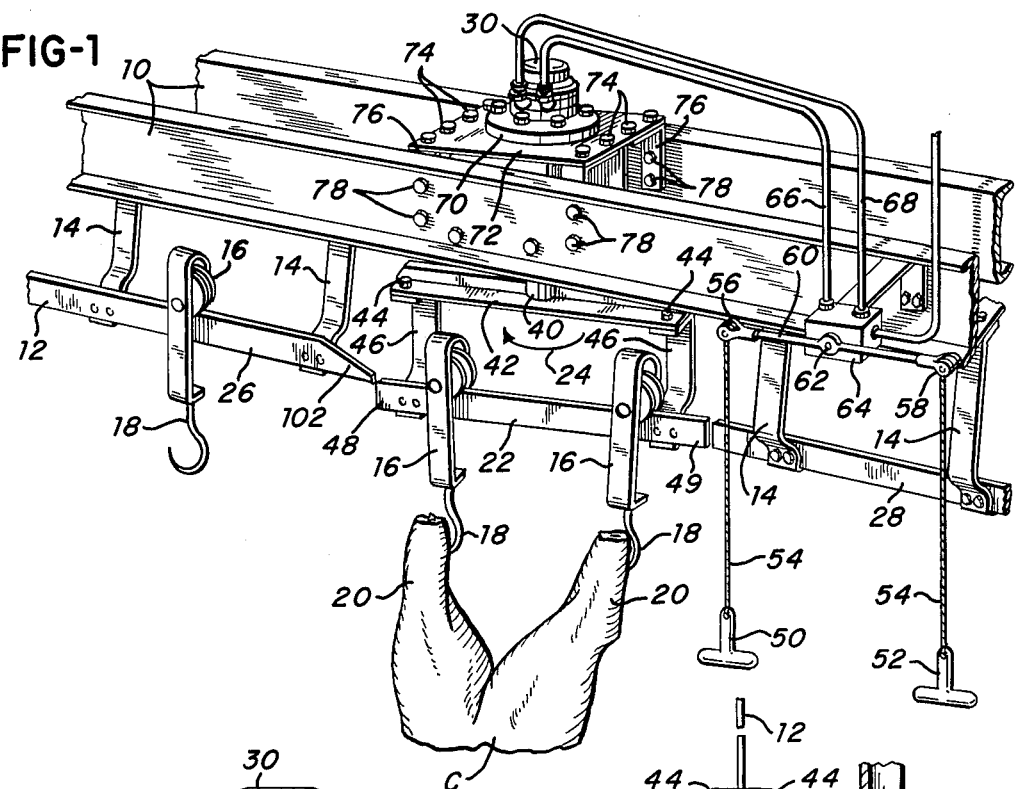
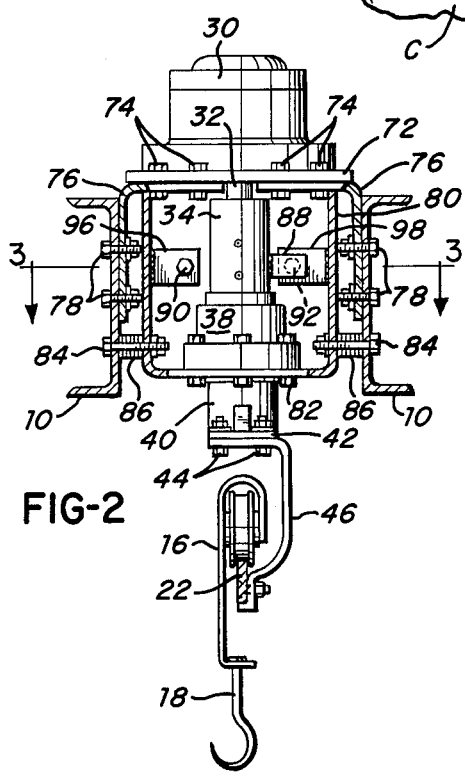
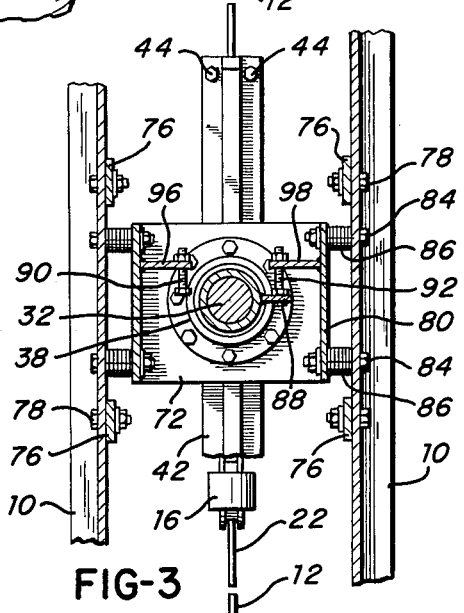
INVENTOR.
FREDERICK A. ZAENKERT
BY *Kinney & Schenk*
ATTORNEYS July 19, 1966  F. A. ZAENKERT  3,261,301
RAIL TURNING ATTACHMENT
Filed Sept. 16, 1963  3 Sheets-Sheet 2
FIG-4
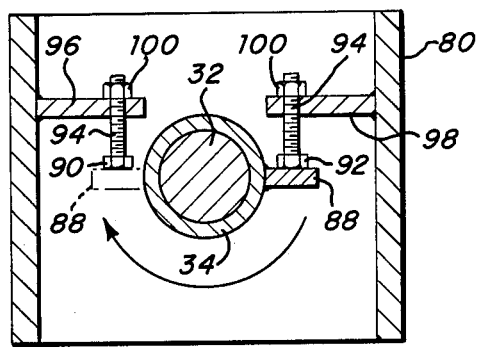
FIG-5
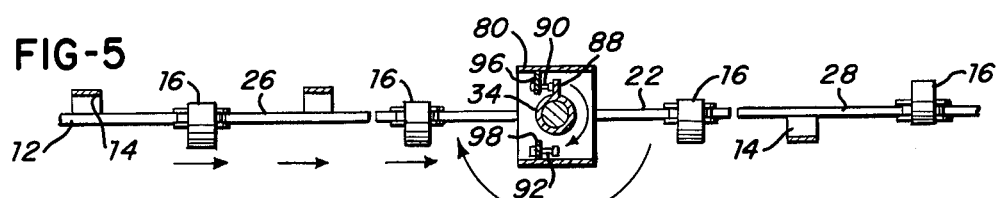
FIG-6
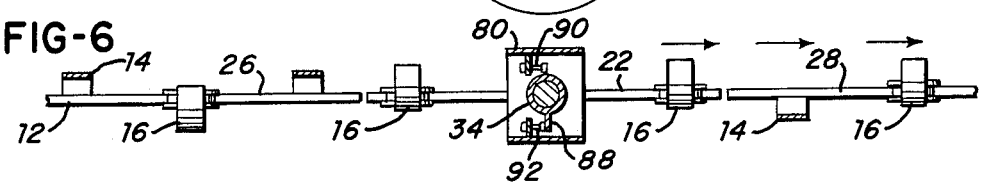
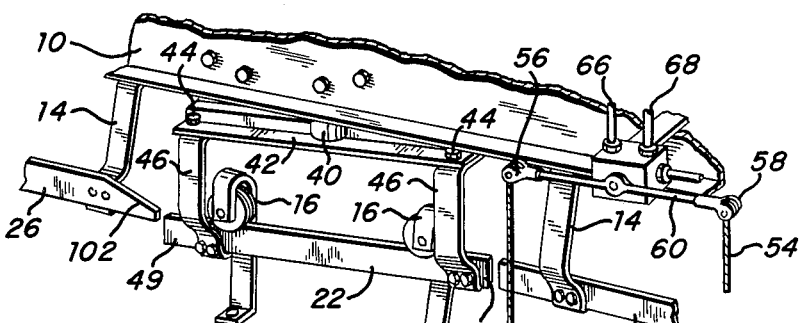
FIG-7
INVENTOR.
FREDERICK A. ZAENKERT
BY
ATTORNEYS

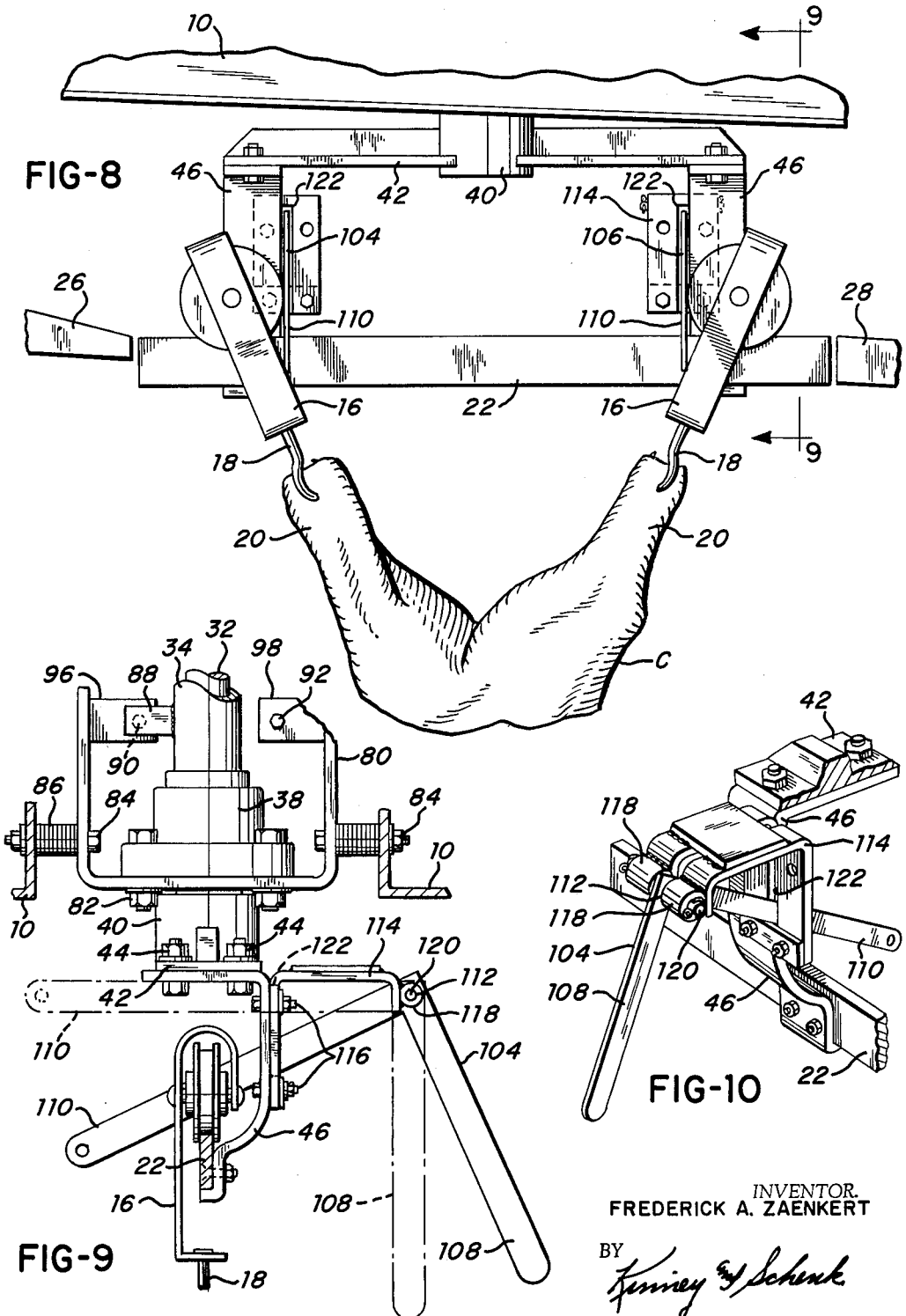

United States Patent Office 3,261,301
Patented July 19, 1966

3,261,301
RAIL TURNING ATTACHMENT
Frederick A. Zaenkert, Cincinnati, Ohio, assignor to The Cincinnati Butchers' Supply Company, Cincinnati, Ohio, a corporation of Ohio
Filed Sept. 16, 1963, Ser. No. 309,169
16 Claims. (Cl. 104—93)

The present invention relates to a rail turning attachment, the purpose of which is to effect rotation or partial rotation of an object, such as a meat carcass, at a particular location along the length of a conveyor rail from which the object is suspended while undergoing processing.

In particular, the rail turning attachment is well adapted for use in abbatoirs or meat processing plants, wherein carcasses are suspended and carried along an overhead rail from one operators' station to another, at which stations various operations are performed to progressively finish or dress the carcasses to produce salable meat products. At one or more of the stations, it is often necessary or at least convenient to interrupt travel of the carcass along the conveyor rail, and to turn it 180° about a vertical axis so that the operator may have easy access to either the belly or the back of the suspended animal carcass without having to walk around it.

It is therefore an object of the present invention to provide convenient and practical means for turning about a vertical axis, at a dressing station, a suspended carcass brought to the station on an overhead rail conveyor.

A further object of the invention is to provide means in association with the subject rail turning attachment for enabling an operator to spread, and then maintain in spread condition, the legs of a rail-suspended carcass.

Still another object of the invention is to provide means in association with opposite ends of the rail turning attachment which are selectively movable between interferring and non-interferring relationship with respect to trolleys supported on said rail.

Another object is to provide simple, reliable, and inexpensive means to accomplish the foregoing objectives.

A further object of the invention is to reduce the processing time and the cost of labor in the processing of meat animals and the like.

The foregoing and other objects are attained by the means described herein and illustrated in the accompanying drawings, in which:

FIG. 1 is a perspective view of a dressing rail or conveyor including the turning device of the invention, and showing a carcass as delivered to the turning device.

FIG. 2 is a cross-sectional view taken vertically through the turning device.

FIG. 3 is a cross-sectional view taken on line 3—3 of FIG. 2.

FIG. 4 is a detail view showing on an enlarged scale, a stop means illustrated also by FIG. 3.

FIGS. 5 and 6 are top plan views, partly in cross-section, showing a dressing rail or conveyor, with the turning device rotated to two different positions.

FIG. 7 is a perspective view similar to FIG. 1, showing the carcass turned 180 degrees relative to the dressing rail.

FIG. 8 is a side elevation showing a modification of the turning device.

FIG. 9 is a cross-section taken on line 9—9 of FIG. 8.

FIG. 10 is a detail view in perspective, with portions thereof cross-sectioned, showing details of a leg spreader incorporated in FIGS. 8 and 9.

Referring to FIG. 1, the numeral 10 indicates a pair of overhead beams, one of which supports a rail 12 by means of a series of fixed hangers 14. The rail in turn supports a number of wheeled trolleys 16 which carry hooks 18 or similar devices for suspending carcasses such as C, usually by the hind legs 20. Two trolleys may accordingly be employed as a pair to suspend and convey a single carcass as shown. Rail 12 is generally referred to as a dressing rail, and is so hung from a beam 10 as to slope in one direction sufficiently to induce gravity advancement of the trolleys and the carcasses suspended therefrom. In the drawing, FIG. 1, rail 12 slopes downwardly from left to right.

At convenient locations or wherever an attendant is to be stationed for performing a dressing operation upon the carcasses, rail 12 is interrupted to provide a gap to be occupied by a turning rail 22. Such turning rail 22 is adapted for bodily rotation hoizontally as indicated by arrow 24, to present either the belly or the back of the animal to the operater stationed beneath and to one side of the rail. For the purposes of the present disclosure, section 26 of the dressing rail may be referred to as the incoming section, and 28 as the outgoing section, since the carcasses move along the rail from left to right by gravity feed, except at the turning rail 22 which is horizontal or substantially so.

The means for rotating the turning rail 22 may comprise a motor 30 having a vertical shaft 32, rotation of which is limited to 180 degrees, and is reversible as to direction. While motors of various types may be employed, it is considered desirable to provide a pneumatic or hydraulic fluid motor for rotating the turning rail.

As herein disclosed, motor shaft 32 enters a coupler 34 in the form of a sleeve wherein the shaft is secured by set screws 36 or equivalent means. The coupler depends vertically from shaft 32, and a portion of the coupler is journalled in a fixed bearing 38. At its lower end, the coupler carries an extension 40 to which is fixed a horizontal cross-bar 42 adapted to rotate with the coupler and the motor shaft. Opposite ends of the cross-bar carry bolts 44 which serve to suspend the hangers 46, and to the hangers are fixed the opposite end portions 48–49 of the turning rail 22.

From the foregoing, it will be understood that a 180 degree rotation of motor shaft 32 will rotate the cross-bar 42 and turning rail 22 from the FIG. 1 position to the FIG. 7 position, thereby to present either the belly or the back of the suspended animal for dressing by an attendant stationed beneath and to one side of the rail conveyor. Such rotation of the turning rail is under the control of the attendant, and may include a pair of suspended handles 50 and 52.

Handles 50 and 52 may be connected by means of ropes or cables 54 to the opposite ends 56 and 58 of a rocker bar 60, which at its middle is fixed to a valve actuator shaft 62 serving to control a four-way valve 64. A pipe or hose is adapted to convey filtered and lubricated compressed air to the control valve, and the valve in turn directs such air into either of the pipes or hoses 66 or 68 for activating the motor. If handles 50 is pulled to rock the bar 60 in counter-clockwise direction, the valve will direct compressed air through hose 66 to effect rotation of the motor shaft in one direction, whereas pulling the handle 52 will cause the valve to direct air into hose 68 for rotating the motor shaft in the opposite direction. Thus, the operator or attendant may control rotation of the turning rail and the carcass C, by means of handles 50 and 52.

Suitable means are provided for mounting the motor 30 in fixed relation to beams or channels 10. For the purpose, the motor base 70 may be fixed upon a horizontal mounting plate 72 to which are bolted, as at 74, a set of depending brackets 76. These brackets may be bolted as at 78 to the beams or channels 10. Plate 72 suspends a cage or sling 80, within which the bearing 38 is mounted and secured by bolts 82. The sling or cage 80 may be anchored to beams 10 by means of bolts 84 carrying spacer washers 86 accommodating the width of the sling or cage to the spacing of the supporting beams or channels.

To insure alignment of turning rail 22 with the rail sections 26 and 28 in both rotated positions of the turning rail, coupler 34 may carry a laterally extending fixed lug 88 adapted to seat against one or the other of a pair of limit stops 90 or 92 carried by sling 80. The stops may be in the form of adjustment screws (FIG. 4), threaded into tapped holes 94 in the inwardly extending opposed ears 96 and 98 welded or otherwise fixed within the sling. Lock nuts 100 may be used to lock the stop screws in adjusted positions upon the ears.

By referring to FIGS. 4, 5 and 6, it is evident that coupler 34 may be stopped in either direction of rotation by limit stop screws 90 and 92, and with proper adjustment of the screws the turning rail will align with the dressing rail sections 26 and 28 in both of its rotated positions, FIGS. 1 and 7. Motor 30 is designed to stall at the stopped positions of the turning rail.

In the preferred embodiment of the invention, rail hangers 14 supporting the outgoing dressing rail section 28 are disposed at the front side of said rail section, whereas those hangers 14 which support the incoming rail section 26 are disposed at the rear side of section 26. FIGS. 1, 5 and 6 clearly disclose this reversal of hangers 14. The purpose is to send the carcass from the operator's station in 180 degree rotated position, so that if the carcass comes to the operator's station with its back exposed to the operator, it will leave with its belly exposed to the operator. Thus, the carcass is sent onto outgoing rail section 28 without waiting for a reverse rotation of the turning rail after dressing, the reversing being performed after the dressed carcass has left the turning rail. It may be noted that the turning rail will accept a successive carcass only when said rail is in the initial position of FIG. 1, with its hangers 46 disposed at the same side of the rail as are the hangers 14 of rail section 26. Thus, it is imperative that the turning rail be rotated to the initial position of FIG. 1 after delivering a carcass to the outgoing rail 28.

Since rail sections 26 and 28 are inclined, and turning rail 22 is horizontal, incoming rail section 26 preferably is provided with a downwardly inclined end portion 102 to compensate for the differential in elevation of sections 26 and 28, thereby ensuring a smooth transfer of trolleys 16 onto the turning rail.

In the modification, FIGS. 8, 9 and 10, the turning rail structure is equipped with means to spread apart the legs of the suspended animal by holding in widely spaced relationship the trolleys suspending the animal. This in many instances facilitates and expedites the dressing of the carcass suspended from the turning rail. The leg spreader may comprise a pair of bell crank levers 105 and 106 each having a pair of rigid arms 108 and 110 converging at a pivot point 112. Each bell crank is pivoted at 112 upon a bracket 114 secured as at 116 to a hanger 46 of the turning rail. As FIG. 9 clearly indicates, bell crank 104 may be rocked about pivot 112 to two positions. In the operative position depicted by full lines, the arm 110 of the bell crank serves as a block or stop against trolley 16 to prevent movement of the trolley along rail 22.

Further, referring to FIG. 8, both bell cranks 104 and 106 are shown moved to the operative position at which both trolleys 16—16 are held thereby at locations near the ends of turning rail 22, for holding the carcass legs 20—20 in widely spaced relationship.

To render the bell cranks inoperative, an attendant merely grasps an arm 108, which serves as a handle, and rocks the bell crank to the broken line position of FIG. 9. In this position, arm 110 is displaced upwardly and away from the trolley, to permit free movement thereof along rail 22. When both bell cranks are moved to the inoperative position, the two trolleys suspending the carcass may adjust themselves along the rail, permitting the carcass to hang normally as in FIG. 1.

According to FIG. 10, bracket 114 may carry hinge eyes 118 to support a hinge pin or pivot member 120 serving to pivot a bell crank at 112. Each bracket 114 may also be provided with a guide slot 122 receptive of an arm 110, to reinforce the arm against bending as it impinges upon and blocks movement of a trolley 16. Both brackets 114 of the turning rail structure have hinge eyes 118 and a slot 122, as shown in FIG. 10.

From the foregoing, it will be understood that bell cranks 104 and 106 when elevated to the inoperative position, provide no interference with movement of trolleys 16 along turning rail 22; however, if the attendant wishes to spread the legs of the carcass while it is suspended from the turning rail, he need only grasp the handles 108 to rotate arms 110 into intercepting position between adjacent trolleys, for holding the trolleys in the extreme separated position of FIG. 8. The carcass may then be dressed with greater ease and despatch in many instances. When the attendant wishes to discharge the carcass from turning rail 22 onto the outgoing rail section 28, he moves the bell cranks to the inoperative elevated position at which the trolleys are free to roll along the rails.

It is to be understood that various modifications and changes may be made in the structural details of the device, within the scope of the appended claims, without departing from the spirit of the invention.

What is claimed is:

1. Apparatus for handling carcasses undergoing dressing, comprising in combination, an incoming and an outgoing conveyor rail substantially aligned and having ends spaced apart to provide a gap, a movable turning rail normally spanning the gap and having opposite ends, and means supporting the turning rail for bodily rotation to dispose either of its ends in aligned juxtaposition with the spaced ends of the conveyor rails, a pair of trolleys adapted to ride upon the conveyor rails and the intervening turning rail, said trolleys being movable on the rails independently of one another and each including means to grasp and suspend a leg of a single carcass whereby upon rotation of the turning rail the carcass is rotated therewith while suspended from two trolleys carried by the turning rail, and means for imparting partial rotation to the turning rail, to selectively expose the back or the belly of the carcass to an operator stationed to face the turning rail, and means carried by the turning rail supporting means, selectively operable to maintain a predetermined extreme spacing of the pair of trolleys on the turning rail, to spread the suspended legs of the carcass while undergoing dressing.

2. Apparatus for handling carcasses undergoing dressing, comprising in combination, substantially horizontal incoming and outgoing conveyor rails substantially aligned and having ends spaced apart to provide a gap, suspension means for said rails, and a movable turning rail normally spanning the gap and having opposite ends, means supporting the turning rail for bodily rotation about a vertical axis located midway between the ends of the turning rail, to dispose either of its ends selectively in aligned juxtaposition with the spaced ends of the conveyor rails, a rotary fluid motor on the rail suspension means including a rotary drive shaft, and means below and in axial alignment with said drive shaft connecting the turning rail to said drive shaft for rotation therewith, a source of fluid under pressure, and means for introducing such fluid to the motor to selectively rotate the drive shaft thereof in forward and reverse directions, means intermediate said motor and turning rail limiting the forward and reverse rotations of the drive shaft and the turning rail to 180 degrees, at which limits the ends of the turning rail are substantially aligned with the ends of the conveyor rails, and independently movable trolleys on the conveyor rails to traverse the latter and the intervening turning rail, said trolleys each including suspenders for the legs of carcasses hung from the trolley means.

3. Apparatus for handling carcasses undergoing dressing, comprising in combination, substantially horizontal incoming and outgoing conveyor rails substantially aligned and having ends spaced apart to provide a gap, suspension means for said rails, and a movable turning rail normally spanning the gap and having opposite ends, means supporting the turning rail for bodily rotation about a vertical axis located midway between the ends of the turning rail, to dispose either of its ends selectively in aligned juxtaposition with the spaced ends of the conveyor rails, a fluid motor on the rail suspension means including a rotary drive shaft, and means transmitting the drive shaft rotation to the turning rail, means for introducing a fluid under pressure to the motor, for selectively rotating the drive shaft in forward and reverse directions, means limiting the forward and reverse rotations of the drive shaft and the associated turning rail to 180 degrees, at which limits the ends of the turning rail are substantially aligned with the ends of the conveyor rails, a pair of trolleys movable along the incoming rail and onto the turning rail, and finally from the turning rail onto the outgoing rail, said trolleys being movable along the rails independently of one another and each including means to grasp and suspend a leg of a single carcass, whereby upon bodily rotation of the turning rail while carrying the carcass and the two suspending trolleys, said carcass is rotate in unison with the turning rail, selectively operable means carried by the turning rail to maintain a predetermined spacing of the trolleys on the turning rail, to spread abnormally the legs of the suspended carcass.

4. A rail turning structure for receiving, rotating, and relaying trolleys advanced thereto by an overhead conveyor rail which supports the trolleys, said structure comprising a suspended sling having a base and a pair of overlying brackets, a reversing fluid motor supported by the brackets above the sling, said motor including an upright rotary shaft depending from the motor into the confines of the sling, a bearing fixed upon the sling base in axial alignment with the motor shaft, a coupler fixed to the motor shaft and including an extension journaled in the bearing for rotation with the motor shaft, a horizontal cross-bar having opposite ends and a middle portion, and means fixing the middle portion of the cross-bar to the extension, a pair of hangers fixed to the cross-bar near the ends thereof, and a horizontal turning rail fixed to the hangers, said turning rail having opposite ends alignable with the conveyor rail to receive trolleys advanced thereby, means on each trolley to suspend a leg of a carcass, means for introducing a fluid under pressure to the motor for selectively rotating the drive shaft in forward and reverse directions, a laterally extending fixed lug on the coupler for movement in a circular path therewith, and means on the sling and in the path of movement of the lug, for limiting the extent of forward and reverse rotation of the coupler and the motor shaft to an approximate 180 degrees in both directions of rotation.

5. The combination as set forth in claim 4, wherein each hanger carries a stop member selectively movable from an inoperative position out of the path of movement of the trolleys over the turning rail, to an operative position in the path of trolley movement, for engaging and maintaining a widely spaced disposition of a pair of trolleys upon the turning rail.

6. A rail turning structure for receiving, rotating, and relaying pairs of trolleys advanced thereto by an overhead conveyor rail which tractionally supports the trolleys, said structure comprising a suspended sling having a base and a covering support, a reversing fluid motor fixed to the covering support above the sling, said motor including an upright rotary shaft depending from the motor into the confines of the sling, a bearing fixed upon the sling base in axial alignment with the motor shaft, a coupler fixed to the motor shaft and including an extension journaled in the bearing for rotation with the motor shaft, a horizontal cross-bar having opposite ends and a middle portion, and means fixing the middle portion of the cross-bar to the extension for rotation with the extension and the motor shaft thereto connected, a pair of hangers fixed to the cross-bar near the ends of the latter, and a horizontal turning rail supported by the hangers, said turning rail having opposite ends alignable with the conveyor rail to receive the trolleys advanced thereby, means on each trolley to suspend a leg of a carcass, means for introducing a fluid under pressure to the motor for selectively rotating the drive shaft in forward and reverse directions, and cooperative adjustable means on the sling and the coupler for limiting the extent of forward and reverse rotation of the coupler and the motor shaft to an approximate 180 degrees in both directions of rotation.

7. The combination as set forth in claim 6, wherein each hanger carries a stop member selectively disposable into the path of movement of the trolleys along the turning rail, for establishing a predetermining spacing of one trolley from the other upon the turning rail.

8. A rail turning structure for receiving, rotating, and relaying pairs of trolleys advanced thereto by an overhead conveyor rail which tractionally supports the trolleys, said structure comprising a cage member having a base and a cover, a reversing motor fixed to the cover and having a depending rotary drive shaft, a bearing fixed upon the cage member base in axial alignment with the motor shaft, a coupler fixed to the motor shaft and including an extension journaled in the bearing for rotation with said shaft, means for selectively activating the motor to produce forward and reverse rotations of the motor shaft, and means limiting such motor shaft rotations to approximately 180 degrees in both the forward and the reverse directions, a horizontal cross-bar having opposite ends, and means for transmitting rotary motion of the coupler to the cross-bar, a pair of hangers fixed to the cross-bar near the ends of the latter, and a horizontal turning rail supported by the hangers, said turning rail having opposite ends alignable with the conveyor rail to receive the trolleys advanced thereby, and means on each trolley to grasp and suspend a leg of a carcass.

9. The combination as set forth in claim 8, wherein is included stop means selectively disposable into the path of movement of the trolleys along the turning rail, for establishing a predetermined spacing of one trolley from the other upon the turning rail.

10. A rail turning sturcture for receiving, rotating, and relaying pair of trolleys advanced thereto be an overhead substantially horizontal conveyor rail which tractionally supports the trolleys, said structure comprising a horizontal turning rail having opposite ends and a middle portion, means supporting the turning rail for rotation about a vertical axis passing through the middle portion of the turning rail, with the ends of the turning rail alignable with the conveyor rail in position to receive the trolleys from the conveyor rail, a motor having a drive shaft coupled to the turning rail and including cooperative plural means limiting rotation of the turning rail to a half-rotation upon each successive actuation of the motor, means on each trolley whereby each trolley suspends individually one leg of a carcass hung therefrom, and means associated with the turning rail for spreading the legs of the carcass while the trolleys rest upon the turning rail.

11. The combination as set forth in claim 10, wherein said cooperative means includes adjustment means for facilitating the alignment of the turning rail ends with the conveyor rail.

12. Apparatus for handling carcasses undergoing dressing, comprising a conveyor rail having incoming and outgoing sections having ends in spaced substantial alignment forming a gap therebetween, a turning rail of a length to span said gap, a fluid operated reversible rotary motor having a shaft, means supporting said motor above said gap with said shaft extending downward toward the center of the gap, a cross bar coupled midway of its ends to the lower end of said shaft to be rotated in a substantially horizontal plane by said motor, a pair of hangers each secured to and depending from one end of said cross bar, said hangers being secured at their lower ends to the same side of and each adjacent to an end of said turning rail, said turning rail being adapted to have run thereon from the incoming rail, a pair of trolleys each carrying a means for attachment to a leg of a carcass, means for selectively directing operating fluid to said reversible motor to alternately rotate the same and the said cross bar clockwise and counter-clockwise, means for limiting said alternate rotations to 180 degrees and for positioning said turning rail at the limit of each alternate 180 degree rotation in alignment with said ends of the incoming and outgoing rail sections, and the last said means comprising an element carried by and turning with said motor shaft and diametrically spaced stops alternately engaged by said element.

13. Apparatus according to claim 12, wherein said incoming and outgoing rail sections are disposed on an inclination for gravitational movement of trolleys from the incoming section toward the outgoing section, said turning rail being subtantially horizontally supported, and said incoming rail section being formed at its end to guide each trolley downwardly onto the top of the adjacent end of the turning rail when the latter is positioned in said gap.

14. Apparatus according to claim 12, with a pair of brackets each supported by one end of said cross bar and having an elongate part extending laterally outwardly from the side of the bracket remote from the turning rail and said part having an outer end portion, an arm having an end pivotally attached to said outer end portion of said bracket part to swing vertically, said arms extending across the top of the turning rail and adapted to have lowered positions to be interposed between a pair of pulleys on the turning rail to maintain the pulleys in stationary separated relation, and means facilitating vertical swinging of said arms.

15. Apparatus for handling carcasses undergoing dressing, comprising an overhead supporting structure embodying spaced parallel members, a substantially U-shaped sling disposed between said members and having upright side parts and a bottom cross part, said side parts being secured to the parallel members, a fluid operated reversible motor supported on said members above said sling ad having a shaft extending downwardly toward said bottom cross part, a bearing unit supported in said sling upon said bottom cross part, a coupler sleeve in and extending down through said bearing and through said cross part and having said motor shaft extending therein and secured thereto, a cross bar secured intermediate its ends to said sleeve to be rotated by the motor in a substantially horizontal plane, a conveyor rail suspended below said cross bar and having incoming and outgoing sections in spaced substantial alignment forming a gap therebetween, said ends of the rail sections and the turning axis of the cross bar lying in a common vertical plane, a turning rail of a length to span said gap, a pair of hangers each secured to and depending from one end of said cross bar, said hangers each being secured at its lower end of the turning rail adjacent to an end of the latter, the turning rail being adapted to have run thereon from the incoming rail a pair of trolleys each carrying a means for attachment to a leg of a carcass, means for selectively directing operating fluid to said reversible motor to alternately rotate the same with the cross rail and the turning rail, clockwise and counter-clockwise, and means for limiting said alternate rotations to 180 degrees for positioning the turning rail in alignment with said incoming and outgoing rail ends comprising a lug on and projecting from said sleeve, and limit stop members carried by said side parts of the sling at diametrically opposite sides of said sleeve in the path of circular movement of said lug.

16. Apparatus according to claim 15, wherein said stop members consist of ears projecting inwardly from the said side parts of the sling and screw elements each threaded into an ear and adjustable relative to the ear.

References Cited by the Examiner

UNITED STATES PATENTS

| | | | |
|---|---|---|---|
| 1,538,925 | 5/1925 | Buckham | 104—99 |
| 2,407,620 | 9/1946 | Vinsant | 104—97 |
| 2,883,700 | 4/1959 | Liebmann. | |
| 3,022,745 | 2/1962 | Roberts | 104—99 |
| 3,063,383 | 11/1962 | Toennies | 104—99 |
| 3,078,811 | 2/1963 | Kottner | 104—172 |
| 3,102,496 | 9/1963 | Price | 104—99 X |

ARTHUR L. LA POINT, *Primary Examiner.*

LEO QUACKENBUSH, MILTON BUCHLER,
*Examiners.*

F. W. MONAGHAN, *Assistant Examiner.*